United States Patent [19]
Zalipsky et al.

[11] 4,219,474
[45] Aug. 26, 1980

[54] HETEROCYCLIC PHENYL AZO HYDROXYBENZENES

[75] Inventors: Jerome J. Zalipsky, Melrose Park; Dahyabhai M. Patel, Ambler, both of Pa.

[73] Assignee: William H. Rorer, Inc., Fort Washington, Pa.

[21] Appl. No.: 888,604

[22] Filed: Mar. 20, 1978

[51] Int. Cl.² .................. C07C 107/06; A61K 31/63; A61K 31/635; A61K 31/655
[52] U.S. Cl. .................................. 260/156; 260/208; 424/226
[58] Field of Search .................. 260/156; 424/226

[56] References Cited

U.S. PATENT DOCUMENTS

| | | | |
|---|---|---|---|
| 2,396,145 | 3/1946 | Askelof et al. | 260/156 |
| 3,681,319 | 8/1972 | Lindberg | 260/156 |
| 3,915,951 | 10/1975 | Agback et al. | 260/156 |

OTHER PUBLICATIONS

Venkataraman, *The Chemistry of Synthetic Dyes*, vol. I, Academic Press Inc.: New York, 1952, p. 415.
Doraswamy et al, *Chemical Abstracts*, vol. 41, 1947, 2015f.
*Chemical Abstracts*, vol. 41, Formula Index, $C_{17}H_{14}N_4O_3S$.

*Primary Examiner*—Floyd D. Higel
*Attorney, Agent, or Firm*—James A. Nicholson

[57] ABSTRACT

The following novel azo compounds, pharmaceutically acceptable salts and process for preparing the same are disclosed: 2-[(p-(2-pyridylsulfamoyl)phenyl)azo]hydroxybenzene; 3-[(p-(2-pyridylsulfamoyl)phenyl)azo]salicylic acid; and 5-[(p-(4-(2-pyridylanilino))-N-phenyl)azo]salicylic acid.

1 Claim, No Drawings

HETEROCYCLIC PHENYL AZO HYDROXYBENZENES

CROSS REFERENCES TO RELATED APPLICATIONS

None.

SUMMARY OF THE INVENTION

This invention describes new azo compounds and the process for their preparation. This invention further provides valuable pharmaceutical preparations which contain these azo compounds as anti-bacterial agents.

BACKGROUND OF THE INVENTION

Pharmaceutical compositions containing azo compounds have been used for their bactericidal properties and among the same are those described as heterocyclic sulphonamide azo compounds in U.S. Pat. No. 2,396,145 to Askelöf et al. and U.S. Pat. No. 3,681,319 to Lindberg. These patents describe a group of azo compounds which are essentially characterized by the formula:

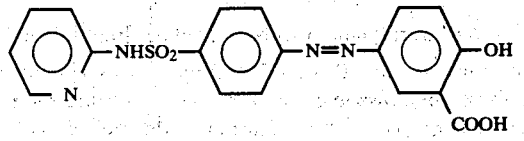

To the first end of the azo linkage is attached a benzene ring having hydroxy substitution in the para position. The second end of the azo linkage is attached to a p-[2-pyridylsulfamoyl]-phenyl group. The compounds thus disclosed in these patents have bactericidal characteristics.

We have unexpectedly found novel azo compounds which also possess similar bactericidal characteristics but whose structures are not characteristic of those of U.S. Pat. Nos. 2,396,145 and 3,681,319.

We have unexpectedly found that 2-[(p-(2-pyridylsulfamoyl)phenyl)azo] hydroxybenzene has useful properties as an anti-bacterial agent and yet this molecule has neither the essential carboxy group present nor is it substitution at the first end of the azo linkage in the essential para positions to the hydroxy group. Further, this ring also contains a hydroxy group substituted in the ortho position to the azo linkage.

Also, we have unexpectedly found that 3-[(p-(2-pyridylsulfamoyl)phenyl)azo] salicylic acid has useful properties as an anti-bacterial agent and also this molecule is not substituted at the first end of the azo linkage in the essential para position to the hydroxy group, but rather it is substituted in the ortho position to the hydroxy group.

Additionally, we have unexpectedly found that 5-[(p-(4-(2-pyridylanilines))-N-phenyl)azo] salicylic acid has useful properties as an anti-bacterial agent and this molecule does not contain the essential sulfamoyl linkage between the 2-pyridyl and phenyl moieties at the second end of the azo linkage. This molecule further contains a p-anilino group between the 2-pyridyl and phenyl moieties.

We have also found that these compounds can be combined with pharmaceutical excipients to form anti-bacterial preparations.

DESCRIPTION AND PREFERRED EMBODIMENTS

This invention describes the compounds I–III:

2-[(p-(2-pyridylsulfamoyl)phenyl)azo]hydroxybenzene   I

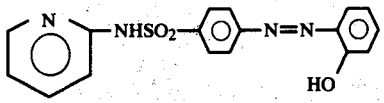

3-[(p-(2-pyridylsulfamoyl)phenyl)azo]salicylic acid   II

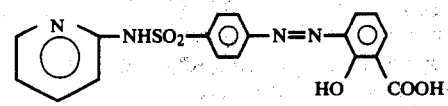

5-[(p-(4-(2-pyridylanilino))-N-phenyl)azo]salicylic acid   III

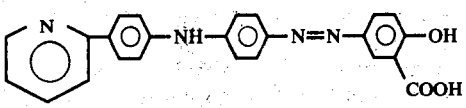

The invention also describes the pharmaceutically acceptable salts of compound II and III which are formed with the carboxylic acid. Such salts would include those formed from metal ions such as sodium, potassium and aluminum, as well as those formed from a suitable amine such as the mono, di and tri-ethanolamine salts and the d-glucamine salts. Of course the desired salt would be one chosen according to the physical and therapeutical properties it confers upon the molecule for solubility, administerability or the like.

The compounds of this invention exhibit useful antibacterial properties. For these purposes, they can be employed in any way which makes use of their anti-bacterial properties. The compounds of this invention can therefore be administered orally, parenterally or topically. Orally, they may be administered in tablets, hard or soft capsules, aqueous or oil suspensions, dispersible powders or granules, emulsions, syrups or elixers. The optimum dosage of course will depend on the compound being used and the type of severity and sensitivity of the condition being treated. In any specific case, the appropriate dosage selected will further depend on factors of the patient which may influence response to the drug; for example, general health, age, weight etc. of the subject being treated.

The proportions of the anti-bacterial employed in the compositions will therefore vary according to the compound and the use intended. In general, it is desirable to incorporate at least 1% by weight but much larger amounts, for instance 10%, 25% or even 50% can be used, particularly if, as is commonly the case, the composition is a concentrated one intended to be diluted before use.

Topically, they may be used in the form of a solution, a cream, a powder, a gel, an ointment, a salve, a lotion or a milk. They can also be formulated into makeup products or dermatological cakes containing the ingredients standard to this type of composition. These compounds can be incorporated in an amount of 0.5–15% of the weight of the composition depending on the intended use.

Use of these compositions is directed to active treatment and preventative or prophylactic.

All these compositions may be prepared according to methods known to the art for the manufacture of such compositions and may contain one or more agents selected from the group consisting of sweetening agents, flavoring agents, coloring agents, preserving agents, thickening agents, etc. in order to provide a more elegant preparation.

Various tests can be carried out in animal models to show the ability of the compounds of this invention to exhibit anti-bacterial properties. Minimum inhibitory concentration is determined by standard procedures such as the agar solution method or the tube dilution method.

The compounds of this invention may be prepared and used in the same manner as described for azo compounds in U.S. Pat. Nos. 2,396,145 and 3,681,319. Generally, 2-[(p-(2-pyridylsulfamoyl)phenyl)azo]hydroxybenzene may be prepared by coupling a p-(2-pyridylsulfamoyl)phenyldiazonium salt with phenol. This is carried out in an alkaline medium while heating and maintaining the alkalinity of the reaction mixture until the reaction is complete. The product is isolated from the reaction mixture by chromotographic methods.

3-[(p-(2-pyridylsulfamoyl)phenyl)azo]salicylic acid may be prepared by coupling a p-(2-pyridylsulfamoyl)phenyldiazonium salt with salicylic acid. This is also carried out in an alkaline medium while heating and maintaining the alkalinity of the reaction mixture. This reaction is carried out as described in U.S. Pat. No. 2,396,145 for obtaining 5-[(p-(2-pyridylsulfamoyl)phenyl)azo]salicylic acid. The desired product, II is separated from the reaction mixture by chromotographic methods.

5-[(p-(4-(2-pyridylanilino))-N-phenyl)azo]salicylic acid is prepared by coupling a p-(2-pyridyl-p-anilino)N-phenyldiazonium salt with salicylic acid. This is also carried out under alkaline conditions and isolated by chromotographic methods.

Generally, the salts are prepared in a manner analogous to preparation of the salts of U.S. Pat. No. 3,681,319.

EXAMPLE 1

2-[(p-(2-pyridylsulfamoyl)phenyl)azo]hydroxybenzene

A mixture of 50 g. of 2-(p-aminophenylsulfamoyl)-pyridine dissolved in 50 ml. concentrated hydrochloric acid and 25 ml. of water is diazotized with a solution of 13.8 g. of sodium nitrite. This diazo suspension is then added portionwise to a mixture of 19 g. phenol, 24 g. potassium hydroxide and 12 g. of sodium carbonate in 350 ml. water. The alkalinity of the reaction mixture is maintained by addition of potassium hydroxide solution. The reaction mixture is then poured onto a crushed ice-hydrochloric acid mixture. The precipitate which forms is filtered, washed with water and air dried. The 2-[(p-(2-pyridylsulfamoyl)phenyl)azo]hydroxybenzene is isolated by thin layer chromotography using silica gel HR plates with a chloroform, acetone, acetic acid (90:5:5) solvent system. (Rf 0.83).

EXAMPLE 2

3-[(p-(2-pyridylsulfamoyl)phenyl)azo]salicylic acid

A mixture of 50 g. of 2-(p-aminophenylsulfamoyl)-pyridine dissolved in 50 ml. concentrated hydrochloric acid and 25 ml. of water is diazotized with a solution of 13.8 g. of sodium nitrite. The diazo suspension is then added portionwise to a mixture of 28 g. salicylic acid, 24 g. potassium hydroxide and 12 g. of sodium carbonate in 350 ml. water. The alkalinity of the reaction mixture is maintained by addition of potassium hydroxide solution. The reaction mixture is then heated at 50° C. for ½ hr. and then cooled. This mixture is then poured into a crushed ice-hydrochloric acid mixture. The precipitate which forms is filtered, washed with water and air dried. The 3-[(p-(2-pyridylsulfamoyl)phenyl)azo]salicylic acid is isolated by thin layer chromatography using aluminum oxide plates with a chloroform, methylethyl ketone, formic acid (70:15:10) solvent system (Rf 0.48).

EXAMPLE 3

5-[(p-(4-(2-pyridylanilino))-N-phenyl)azo]salicylic acid

A mixture of 50 g. of 4-(2-pyridyl)-N-(p-aminophenyl)aniline dissolved in 50 ml. concentrated hydrochloric acid and 25 ml. of water is diazotized with a solution of 13.8 g. of sodium nitrite. The diazo suspension is then added portionwise to a mixture of 28 g. salicylic acid, 24 g. potassium hydroxide and 12 g. of sodium carbonate in 350 ml. water. The alkalinity of the reaction mixture is maintained by addition of potassium hydroxide solution. The reaction mixture is then heated at 50° C. for ½ hr. and then cooled. This mixture is then poured into a crushed ice-hydrochloric acid mixture. The precipitate which forms is filtered, washed with water and air dried. The 5-[(p-(4-(2-pyridylanilino))-N-phenyl)azo]salicylic acid is isolated by thin layer chromatography, using silica gel plates with a chloroform, methylethyl ketone, formic acid (30:50:20) solvent system (Rf 0.45).

We claim:
1. A compound selected from the group consisting of 5-[(p-(4-(2-pyridylanilino))-N-phenyl)azo]salicylic acid and the sodium, potassium, aluminum, mono-, di-, and tri-ethanolamine and d-glucamine salts thereof.

* * * * *